US012586596B2

(12) United States Patent     (10) Patent No.:   US 12,586,596 B2

Pfeifenberger et al.     (45) Date of Patent:    Mar. 24, 2026

(54) SYSTEM AND METHOD FOR BACKGROUND NOISE SUPPRESSION BY PROJECTING AN INPUT AUDIO INTO A HIGHER DIMENSION SPACE

(71) Applicant: Sanas.ai Inc., Palo Alto, CA (US)

(72) Inventors: Lukas Pfeifenberger, Salzburg (AT); Shawn Zhang, Palo Alto, CA (US); Monal Patel, Naperville, IL (US); Maxim Serebryakov, Palo Alto, CA (US); Raj Vardhan, Bangalore (IN); Lan Shek, San Ramon, CA (US); Ankita Jha, Bangalore (IN)

(73) Assignee: SANAS.AI INC., Palo Alto, CA (US)

( * ) Notice: Subject to any disclaimer, the term of this patent is extended or adjusted under 35 U.S.C. 154(b) by 0 days.

(21) Appl. No.: 18/890,293

(22) Filed: Sep. 19, 2024

(65) Prior Publication Data

US 2025/0014587 A1     Jan. 9, 2025

(30) Foreign Application Priority Data

May 27, 2024    (IN) .............................. 202441041056

(51) Int. Cl.
    *G10L 21/0208*       (2013.01)
    *G10L 15/28*        (2013.01)
              (Continued)

(52) U.S. Cl.
    CPC .......... *G10L 21/0208* (2013.01); *G10L 25/63* (2013.01); *G10L 15/28* (2013.01);
              (Continued)

(58) Field of Classification Search
    CPC . G10L 21/0208; G10L 21/0232; G10L 25/57; H04M 9/082
    See application file for complete search history.

(56) References Cited

U.S. PATENT DOCUMENTS

| | | | | |
|---|---|---|---|---|
| 2016/0351179 A1* | 12/2016 | Tsilfidis | ................ | H04M 9/082 |
| 2024/0355351 A1* | 10/2024 | Tzur | .................... | G10L 21/0232 |
| 2024/0363117 A1* | 10/2024 | Zhao | ........................ | G10L 15/28 |

FOREIGN PATENT DOCUMENTS

| | | | | | |
|---|---|---|---|---|---|
| CN | 114449297 A | * | 11/2020 | ............. | G10L 25/57 |
| CN | 113782014 A | * | 12/2021 | ............. | G10L 15/06 |
| CN | 118447866 A | * | 9/2023 | ......... | G10L 21/0208 |

OTHER PUBLICATIONS

Single-Channel, Binaural and Multi-Channel Dereverberation 2016/ 0351179, Tsilfidis et al. Dec. 1, 2016.*

* cited by examiner

*Primary Examiner* — Farzad Kazeminezhad

(74) *Attorney, Agent, or Firm* — Troutman Pepper Locke LLP

(57) ABSTRACT

The disclosed technology relates to methods, background noise suppression systems, and non-transitory computer readable media for background noise suppression. In some examples, frames fragmented from input audio data are projected into a higher dimension space than the input audio data. An estimated speech mask is applied to the frames to separate speech components and noise components of the frames. The speech components are then transformed into a feature domain of the input audio data by performing an inverse projection on the speech components to generate output audio data, and also transform the noise components of the frames in the higher dimension space into the lower dimension space using a second inverse projection to learn a difference between speech and noise. The output audio data is provided via an audio interface. The output audio data advantageously comprises a noise-suppressed version of the input audio data.

20 Claims, 6 Drawing Sheets

(51) Int. Cl.
     *G10L 21/0232*        (2013.01)
     *G10L 25/57*          (2013.01)
     *G10L 25/63*          (2013.01)
     *H04M 9/08*           (2006.01)

(52) U.S. Cl.
     CPC .......... *G10L 21/0232* (2013.01); *G10L 25/57*
                   (2013.01); *H04M 9/082* (2013.01)

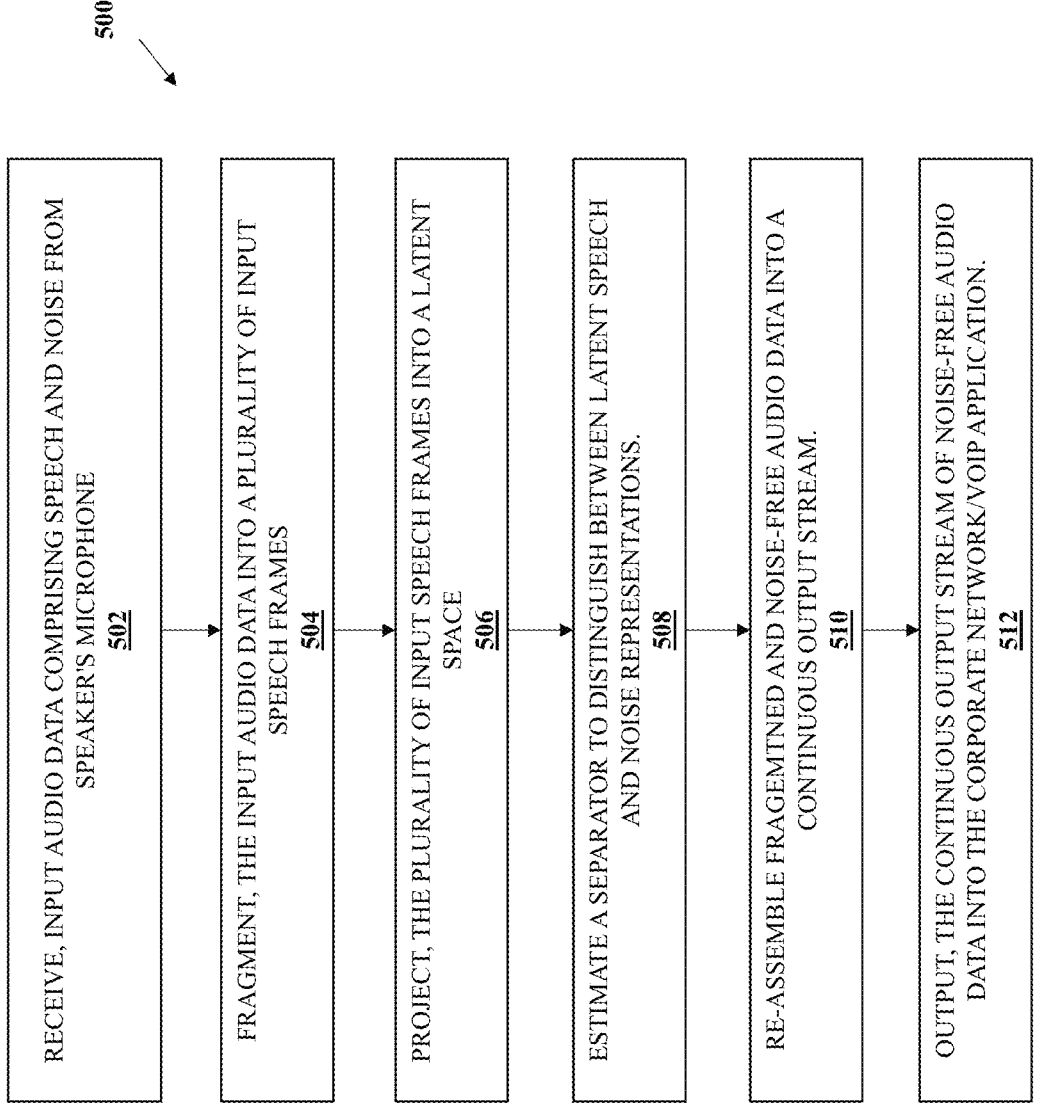

500

RECEIVE, INPUT AUDIO DATA COMPRISING SPEECH AND NOISE FROM SPEAKER'S MICROPHONE
502

FRAGMENT, THE INPUT AUDIO DATA INTO A PLURALITY OF INPUT SPEECH FRAMES
504

PROJECT, THE PLURALITY OF INPUT SPEECH FRAMES INTO A LATENT SPACE
506

ESTIMATE A SEPARATOR TO DISTINGUISH BETWEEN LATENT SPEECH AND NOISE REPRESENTATIONS.
508

RE-ASSEMBLE FRAGEMTNED AND NOISE-FREE AUDIO DATA INTO A CONTINUOUS OUTPUT STREAM.
510

OUTPUT, THE CONTINUOUS OUTPUT STREAM OF NOISE-FREE AUDIO DATA INTO THE CORPORATE NETWORK/VOIP APPLICATION.
512

FIG. 5

SYSTEM AND METHOD FOR BACKGROUND NOISE SUPPRESSION BY PROJECTING AN INPUT AUDIO INTO A HIGHER DIMENSION SPACE

This application claims priority to India Provisional Patent Application No. 202441041056, filed May 27, 2024, which is hereby incorporated herein by reference in its entirety.

FIELD

This technology generally relates to audio analysis and, more particularly, to methods and systems for background noise suppression.

BACKGROUND

In the contemporary digital landscape, effective communication stands as an imperative. Despite various technological advancements facilitating virtual interactions, such as crucial business engagements, live podcasts, or online educational sessions, the persistent challenge of background noise persists, intertwining voices and diminishing message clarity. Whether stemming from external sources like neighboring canines or the continuous drone of urban traffic, extraneous sounds infiltrate our conversations, disrupting their coherence and audibility in digital channels.

The paradigm shift towards remote work and the global proliferation of online communication platforms have underscored the pivotal significance of clear and efficient digital interaction. Nonetheless, the prevalence of background noise in digital exchanges poses a substantial hindrance to productivity and comprehension. Beyond mere nuisance, these sporadic sounds possess the potential to fundamentally distort communication dynamics, precipitating misinterpretations, fatigue, and diminished engagement.

Contemplate a remote employee engaged in a virtual meeting amidst the hustle and bustle of a crowded café or the educator imparting an online lecture amid the cacophony of nearby construction activities. In such scenarios, pivotal speech information may be lost amidst the commotion and resulting background noise, while the endeavor to sustain focus amidst distractions can prove taxing for all involved parties. Unfortunately, current noise suppression techniques in digital communication systems lack sophistication and efficacy, are incapable of adapting to diverse environments, and fail to ensure the selective capture and transmission of intended audio signals.

BRIEF DESCRIPTION OF THE DRAWINGS

The disclosed technology is illustrated by way of example and not limitation in the accompanying figures, in which like references indicate similar elements:

FIG. 5 is a flowchart of an exemplary method for background noise suppression.

DETAILED DESCRIPTION

Figure 1:
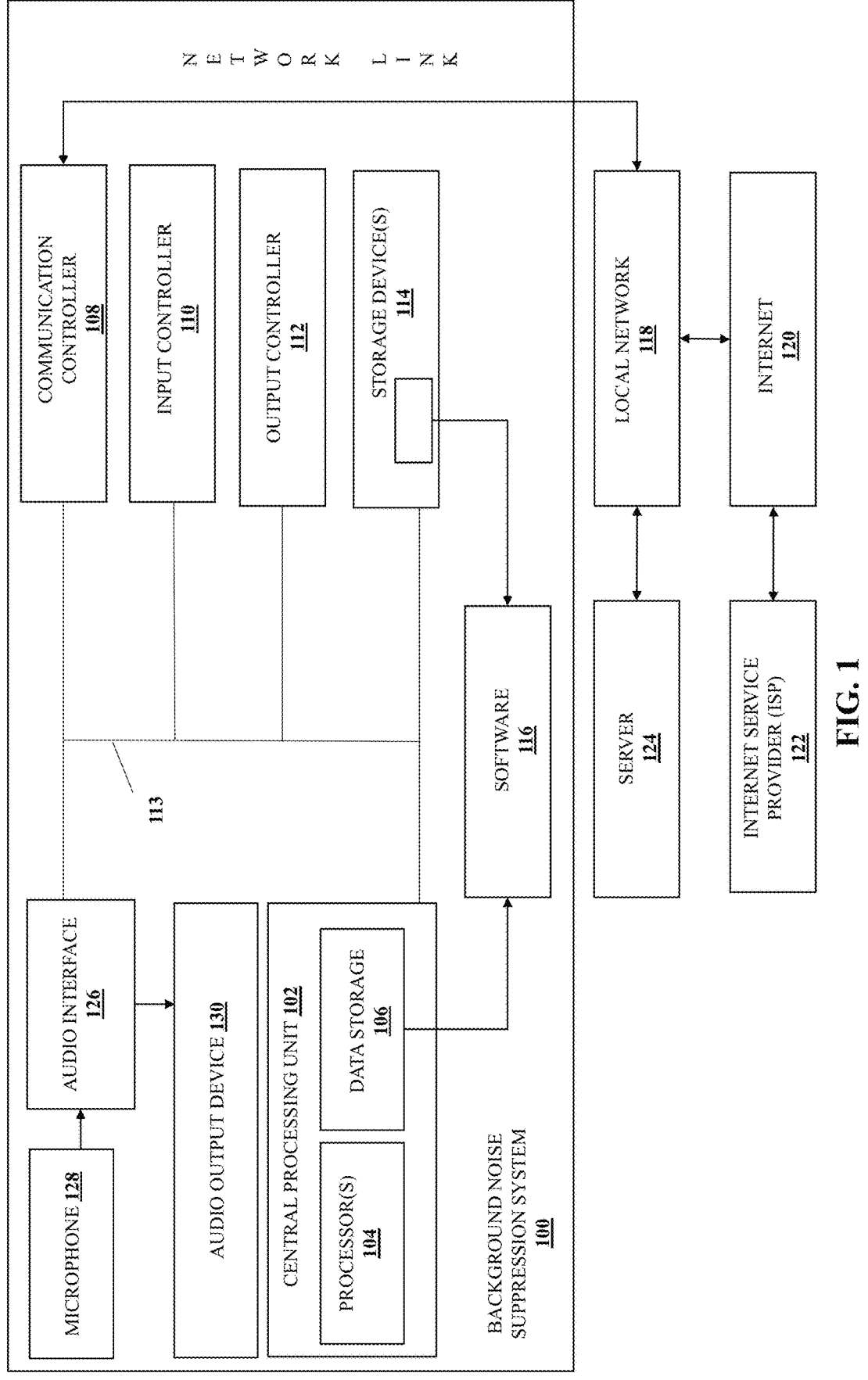
FIG. 1 is a block diagram of an exemplary network environment that includes a background noise suppression system.

Examples described below may be used to provide a method, a device (e.g., non-transitory computer readable medium), an apparatus, and/or a system for background noise suppression. Although the technology has been described with reference to specific examples, various modifications may be made to these examples without departing from the broader spirit and scope of the various embodiments of the technology described and illustrated by way of the examples herein.

The disclosed technology advantageously improves speech clarity and intelligibility in various applications. The technology utilizes noise suppression algorithms, as described and illustrated by way of the examples herein, which accurately estimate the background noise signal from a single microphone recording, thereby suppressing noise without distorting the target speech signal.

In some examples, this technology addresses the challenge of background noise in communication by employing a multi-stage background noise suppression system 100. The background noise suppression system 100 operates by separating a desired or target speech signal from unwanted background noises, ultimately delivering clearer audio. To enhance the robustness of the background noise suppression system 100 in real-world scenarios, augmentations can be introduced as additional background noise, such as chatter and non-verbal sounds, to the original speech signal. This simulated noisy environment allows the background noise suppression system 100 to adapt and perform more effectively when encountering similar conditions during actual use.

A mask estimation stage executed by the background noise suppression system 100 in some examples analyzes incoming audio of an original speech signal (e.g., potentially noisy speech) and utilizes a "mask estimation" technique. This mask estimation acts as a blueprint, identifying which portions of the signal represent speech and which contain background noise. By estimating this mask, which is also referred to herein as a speech mask, the background noise suppression system 100 can effectively isolate the desired or target speech components.

Building upon the mask estimation, a forward projection stage executed by the background noise suppression system 100 in some examples leverages a "forward projection" technique. In these examples, the estimated mask and the noisy signal are projected into a higher-dimensional space, which allows for more sophisticated manipulation of the audio data to further enhance the separation between speech and noise.

Once the projection is completed, the processed information can be translated back into a format usable for audio output. In this stage, the background noise suppression system 100 performs an "inverse projection," transforming the enhanced speech estimate back into the original feature domain.

Optionally, a "noise estimation" stage can be executed by the background noise suppression system 100. This stage focuses specifically on identifying and characterizing the background noise present in the original audio signal. This information may be used further to refine the noise suppression process. Another optional stage executed by the background noise suppression system 100 can involve "inverse mask estimation." This technique aims to create a complementary mask that pinpoints the noise components within the original audio signal. This additional mask, along with the speech mask, can potentially lead to even more precise noise removal.

The final stage executed by the background noise suppression system 100 in some examples involves "post-processing" the enhanced speech signal. This stage focuses on refining the overall audio quality. Techniques like frequency equalization can be employed to correct imbalances in the frequency spectrum, ensuring a more natural sound. Additionally, automatic level control can be applied to maintain consistent audio volume.

Referring now to FIG. 1, a block diagram of an exemplary network environment that includes a background noise suppression system 100 is illustrated. The background noise suppression system 100 in this example includes processor(s) 104, which are designed to process instructions (e.g., computer readable instructions (i.e., code)) stored on the storage device(s) 114 (e.g., a non-transitory computer readable medium) of the background noise suppression system 100. By processing the stored instructions, the processor(s) 104 may perform the steps and functions disclosed herein, such as with reference to FIG. 5, for example.

The background noise suppression system 100 also includes an operating system and microinstruction code in some examples, one or both of which can be hosted by the storage device(s) 114. The various processes and functions described herein may either be part of the microinstruction code and/or program code (or a combination thereof), which is executed via the operating system. The background noise suppression system 100 also may have data storage 106, which along with the processor(s) 104 form a central processing unit (CPU) 102, an input controller 110, an output controller 112, and/or a communication controller 108. A bus 113 may operatively couple components of the background noise suppression system 100, including processor(s) 104, data storage 106, storage device(s) 114, input controller 110, output controller 112, and/or any other devices (e.g., a network controller or a sound controller).

The output controller 112 may be operatively coupled (e.g., via a wired or wireless connection) to a display device (e.g., a monitor, television, mobile device screen, touch-display, etc.) in such a fashion that the output controller 112 can transform the display on the display device (e.g., n response to the execution of module(s)). Input controller 110 may be operatively coupled (e.g., via a wired or wireless connection) to an input device (e.g., mouse, keyboard, touchpad scroll-ball, touch-display, etc.) in such a fashion that input can be received from a user of the background noise suppression system 100.

The communication controller 108 in some examples provides a two-way coupling through a network link to the Internet 120 that is connected to a local network 118 and operated by an Internet service provider (ISP) 122, which provides data communication services to the Internet 120. The network link typically provides data communication through one or more networks to other data devices. For example, the network link may provide a connection through local network 118 to a host computer and/or to data equipment operated by the ISP 122. A server 124 may transmit requested code for an application through the Internet 120, ISP 122, local network 118, and/or communication controller 108.

The audio interface 126, also referred to as a sound card, includes sound processing hardware and/or software, including a digital-to-analog converter (DAC) and an analog-to-digital converter (ADC). The audio interface 126 is coupled to a physical microphone 128 and an audio output device 130 (e.g., headphones or speaker(s)) in this example, although the audio interface 126 can be coupled to other types of audio devices in other examples. Thus, the audio interface 126 uses the ADC to digitize input analog audio signals from a sound source (e.g., the physical microphone 128) so that the digitized signals can be processed by the background noise suppression system 100, such as according to the methods described and illustrated herein. The DAC of the audio interface 126 can convert generated digital audio data into an analog format for output via the audio output device 130.

The background noise suppression system 100 is illustrated in FIG. 1 with all components as separate devices for ease of identification only. One or more of the components of the background noise suppression system 100 in other examples may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The background noise suppression system 100 also may be one or more servers, for example a farm of networked or distributed servers, a clustered server environment, or a cloud network of computing devices. Other network topologies can also be used in other examples.

Figure 2:
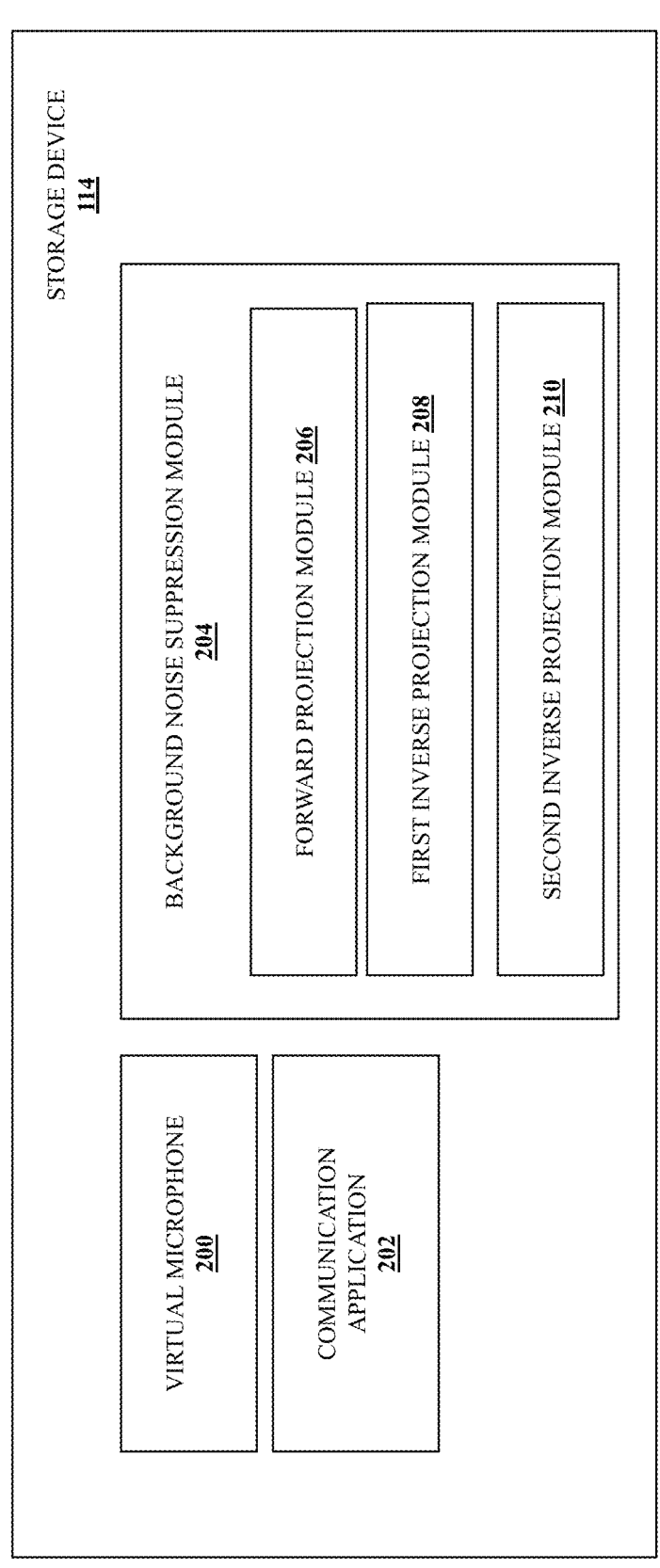
FIG. 2 is a block diagram of an exemplary storage device of the background noise suppression system of FIG. 1.

Referring now to FIG. 2, a block diagram of an exemplary one of the storage device(s) 114 of the background noise suppression system 100 is illustrated. The storage device 114 in this example includes a virtual microphone 200, a communication application 202, and a background noise suppression module 204, which includes a forward projection module 206, a first inverse projection module 208, and a second inverse projection module 210, although other types and/or number of applications or modules can also be included in the storage device 114 in other examples. The virtual microphone 200 receives input audio data (e.g., digitized input audio signals) from the physical microphone 128, which is communicated to the background noise suppression module 204.

The background noise suppression module 204 processes the input audio data using the forward projection module 206, the first inverse projection module 208, and the second inverse projection module 210, as explained in more detail below with reference to FIG. 3, and sends the output audio data to the virtual microphone 200. The virtual microphone 200 then provides the output audio data to the communication application 202. The communication application 202 can be audio or video conferencing or other software that provides an interface to a user of the background noise suppression system 100, for example.

Figure 3:
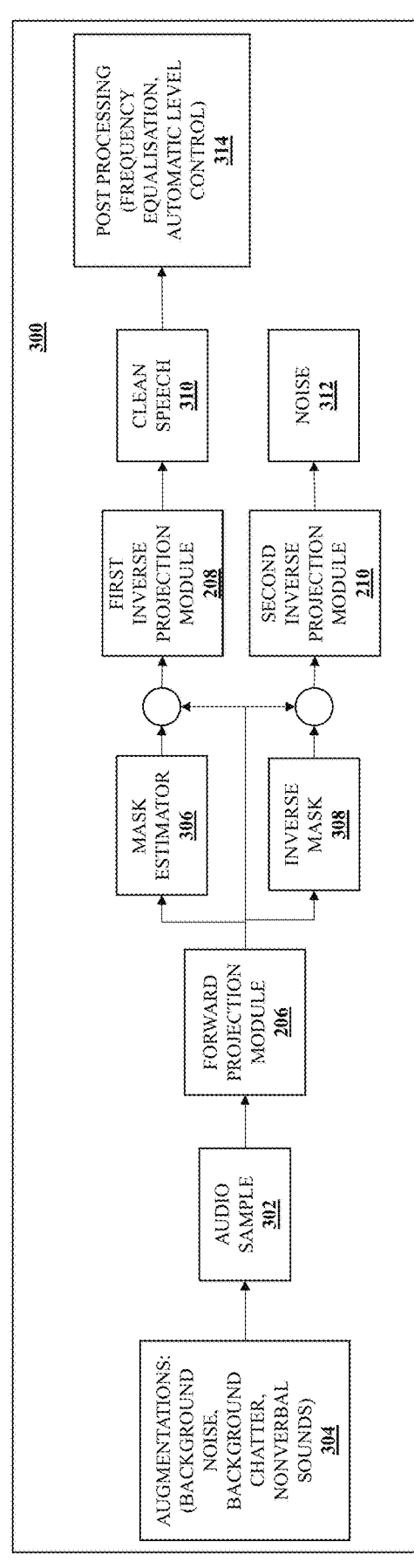
FIG. 3 is a flow diagram of an exemplary method for background noise suppression.

Referring now to FIG. 3, a flow diagram of a method 300 for background noise suppression is illustrated. An original input audio sample 302 is obtained or identified that includes augmentations 304, which represent background noise, background chatter, and/or non-verbal sounds, similar to what the background noise suppression system 100 might encounter in a real-world deployment. The forward projection module 206 fragments the original input audio sample 302 into smaller segments called frames. These frames are then projected into a higher-dimensional space, which allows for more complex manipulation of the audio data during training.

A mask estimator 306, optionally included in the background noise suppression module 204, analyzes the projected representation in the higher-dimensional space. In particular, the mask estimator 306 aims to create a separator, also referred to herein as a speech mask, which distinguishes between the speech and noise components of the projected representation.

After processing in the higher-dimensional space, the information needs to be translated back into a usable format for audio output. Thus, the first inverse projection module 208 in this example performs an "inverse projection" on the estimated speech data (i.e., speech components distinguished by the mask estimator 306), transforming it back into the original feature domain of the original input audio sample 302 to generate clean speech 310.

An inverse mask 308, optionally included in the background noise suppression module 204, aims to identify specifically which parts of the signal contain noise. This additional mask, also referred to herein as a noise mask, along with the speech mask contributes to a more refined background noise suppression process during training. A second inverse projection module 214 optionally transforms the processed noise information back into the original feature domain of the original input audio sample 302 to generate noise 312, which can be used to train a model to more effectively learn the difference between speech and noise. A post-processing, such as frequency equalization and/or automatic level control may be applied (e.g., by the background noise suppression module 204) to the clean speech 310 to thereby improve the quality of the clean speech, resulting in a noise-reduced speech signal that can be output.

Figure 4:
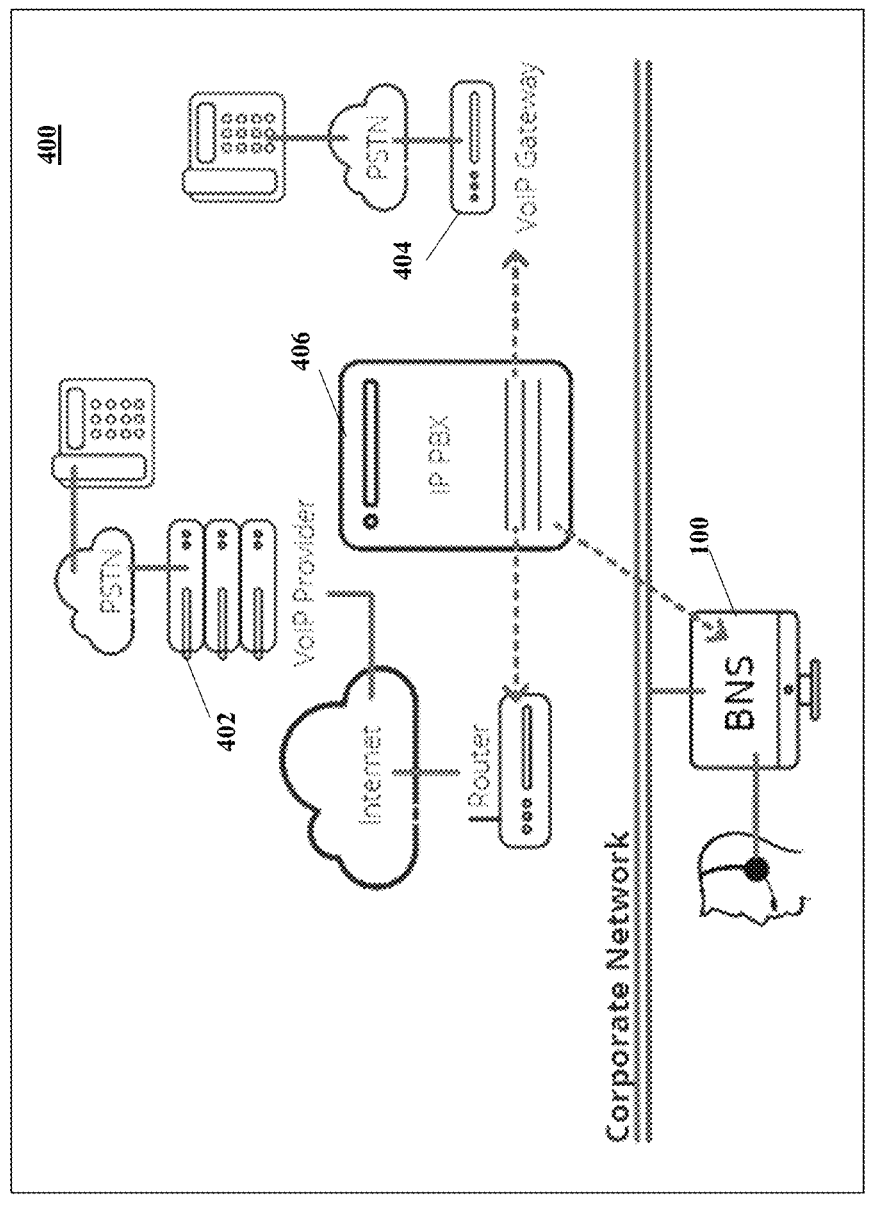
FIG. 4 is a flow diagram of another exemplary method for background noise suppression.

Referring now to FIG. 4, a flow diagram of system 400 for real-time background noise suppression is illustrated. The background noise suppression module 204 operates on the background noise suppression system 100, which is a call center agent's workstation in this example, and interfaces with a dialer used for communication through various protocols such as Zoom™, Microsoft Teams™, or other proprietary software. By residing between the headset microphone and the dialer, the background noise suppression module 204 effectively analyzes and removes background noise from the microphone input in real-time.

To route two-way voice communication channels over digital networks, several components are required including a voice-over-Internet-protocol (VOIP) provider 402, which typically encompasses ISPs offering VOIP services as part of their data plans. This enables end users to make long-distance calls using IP phones, offering a more cost-effective solution compared to traditional landline calls. Public Switched Telephone Networks (PSTNs) also provide VOIP services for both home and mobile phones, serving as the "last mile" connection through cellular towers, fiber connections into private homes, and similar infrastructure. In these examples, a VoIP gateway 404 is employed to connect analog Plain Old Telephone Service (POTS) telephones to digital communication networks, such as a Private Branch Exchange (PBX) 406.

The PBX 406, in turn, serves as a business telephone system to route digital communication protocols, such as the Session Initiation Protocol (SIP). Typically, open-source PBX solutions like Asterisk or commercial products such as Cisco's call Manager™ are utilized for this purpose. SIP encapsulates digital voice transfers and is utilized by IP phones and other digital telephony systems such as Zoom™, Microsoft Teams™, and/or WhatsApp™, among others. In embodiments where a computer with background noise suppression in accordance with the examples described and illustrated herein comprises a digital telephony system (e.g., dialers, Zoom™), the background noise suppression module 206 can be located between the headset microphone and the dialer, effectively enhancing communication quality by removing ambient noise in real-time.

When a call-center agent places or receives a call, the microphone on their headset captures voice along with any surrounding noise. The background noise suppression system 100 intercepts this audio stream before it reaches the dialer. The background noise suppression system 100 then analyzes the audio, intelligently distinguishing between the agent's voice and unwanted background noise. The background noise suppression system 100 effectively suppresses background noise while preserving the agent's voice. Finally, the background noise suppression system 100 transmits the noise-suppressed audio stream to the dialer, ensuring a clear and uninterrupted call for the customer.

The background noise suppression system 100 offers several benefits, including improved call quality for all parties. By reducing background noise distractions, communication clarity is also significantly enhanced, which leads to increased customer satisfaction due to a more positive call experience. Additionally, reduced noise distractions can potentially improve agent productivity by minimizing the need for call repetition caused by unclear audio. The background noise suppression system 100 can be designed to be compatible with various communication protocols, ensuring broad applicability across different call center software and hardware configurations.

Referring now to FIG. 5, a flowchart of an exemplary method 500 for background noise suppression is illustrated. In step 502, the background noise suppression system 100 receives "noisy speech," which is raw audio data input from a speaker's microphone (e.g., physical microphone 128 and/or virtual microphone 200) containing both the desired or target speech and unwanted background noise. This input audio is then processed through a "forward projection" stage by the background noise suppression system 100 in step 504, in which it is broken down into smaller segments (i.e., frames) and, in step 506, projected into a higher-dimensional space.

Thus, in step 508, the mask estimator 306 of the background noise suppression system 100 analyzes these resulting representations in the form of frames in the higher-dimensional space, acting like a separator to identify the difference between the latent representations of the speech and the noise. Finally, the background noise suppression system 100 utilizes an "inverse projection" stage to reassemble the noise-free representations back into a continuous audio stream in step 510. This resulting clean speech 310 output, devoid of, or including significantly reduced, background noise, is then sent by the background noise suppression system 100 in step 512 to a corporate network or VoIP application for communication with improved clarity.

Figure 6:
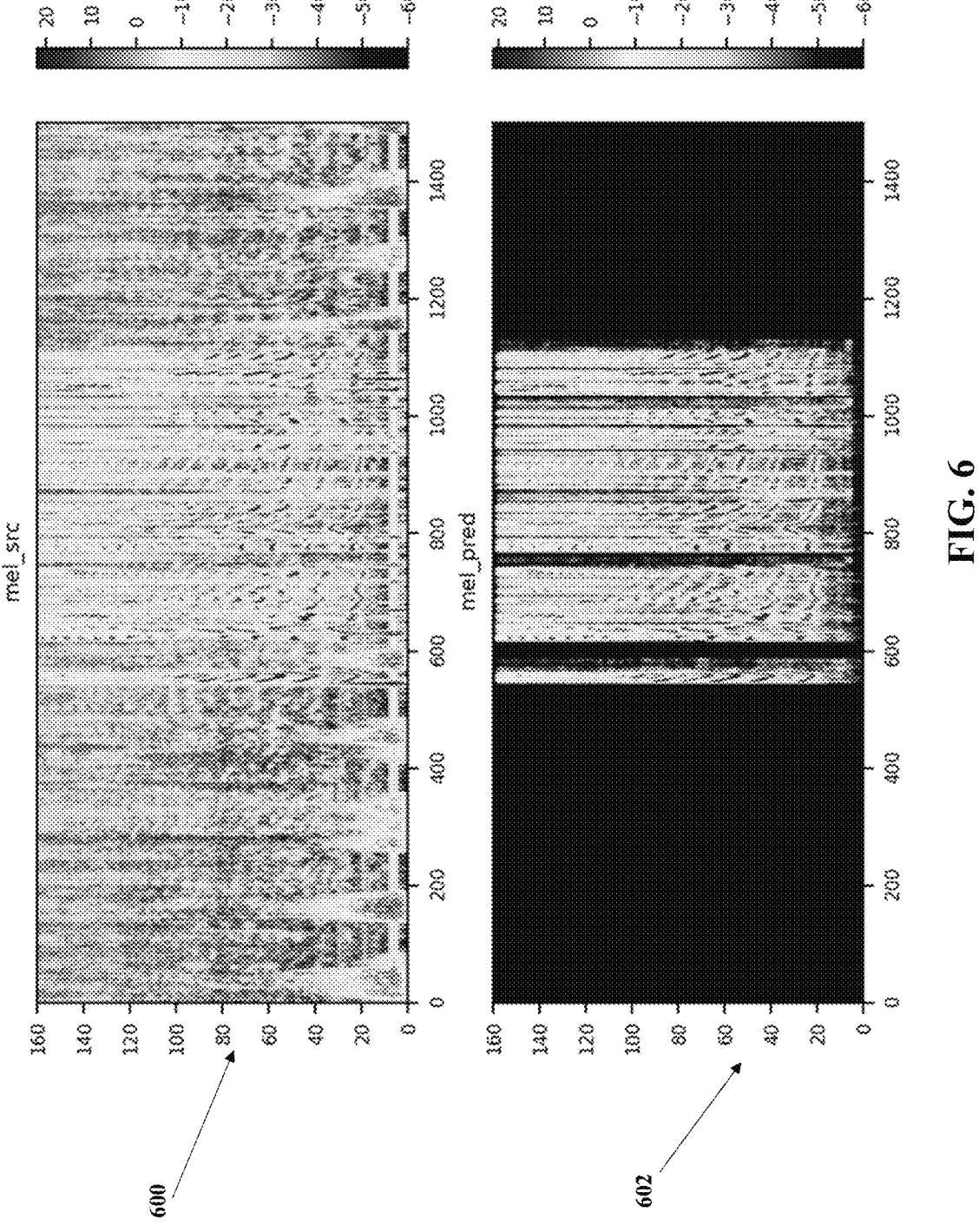
FIG. 6 illustrates exemplary representations of input speech frames and output speech frames into latent space.

Referring to FIG. 6, exemplary representation of input speech frames and output speech frames into latent space are illustrated. The output or target speech shown in the representation 602 and generated based on the technology described and illustrated herein, may advantageously preserve the speech characteristics and enhance the quality, clarity, comprehensibility, and/or intelligibility of degraded speech signals of the input speech shown in the representation 600.

In some examples, the background noise suppression system utilizes a combination of components to deliver exceptional audio quality. Specifically, a projection layer, trained on learned representations, can be used to interpret and process the input audio signal in a sophisticated manner.

A gain estimator, which refines its findings through a dedicated projector, can be used to effectively suppress background noise in the output audio.

In these examples, the background noise suppression system 100 conducts frequency analysis, examining the input audio signal across both time and frequency domains, which allows for targeted noise reduction, particularly focusing on strong noise components in the lower frequencies. By operating within a latent space and utilizing deep learning models to predict the speech mask, the background noise suppression system 100 can achieve superior noise suppression, while preserving the natural characteristics of the voice, in contrast to conventional methods like spectral subtraction.

Additionally, the background noise suppression system 100 in some examples incorporates features enhancing the overall user experience. For example, the introduction of comfort noise can maintain a natural ambiance during calls, prioritizing clarity in preserving the natural voice. Leveraging wavelet transformation, a technique recognized for its effectiveness in Automatic Speech Recognition (ASR), can provide an edge in audio processing across various communication platforms and dialers. The background noise suppression system 100 can be engineered with optimized artificial intelligence inference engines and hardware acceleration, ensuring audio processing occurs within milliseconds. This combination guarantees near-instantaneous noise suppression, ensuring an exceptional user experience.

In yet other examples, the background noise suppression system 100 utilizes dynamic noise suppression capabilities. In these examples, the background noise suppression system 100 continuously analyzes the incoming audio to identify the characteristics of background noise. Based on this real-time analysis, a projection layer or gain estimator can be adjusted to target specific noise types. For example, the background noise suppression system 100 could differentiate between keyboard clicks and traffic noise, applying targeted suppression for each type in real-time, leading to a more refined listening experience.

In other examples, the background noise suppression system 100 is configured to personalize noise suppression based on a speaker's voice. The background noise suppression system 100 in these examples analyzes voice features like pitch and timbre to identify different speakers. By tailoring noise reduction to each speaker's unique characteristics, the background noise suppression system 100 can improve overall intelligibility, particularly in multi-participant calls where different voices might be affected by background noise differently.

The background noise suppression system 100 also can leverage microphone arrays for directional noise suppression. By employing beamforming techniques, the background noise suppression system 100 can identify the direction of background noise. The noise suppression process can then focus on specific directions, allowing the background noise suppression system 100 to preserve desired sounds coming from other directions, such as a colleague speaking nearby. This approach can be particularly useful in conference rooms or open office environments.

One or more embodiments of the disclosed technology can integrate speech emotion recognition algorithms with the background noise suppression system 100. By analyzing the emotional content of the speech, the background noise suppression system 100 can adjust noise suppression levels to prioritize clarity for emotionally charged conversations. For instance, in critical moments, like when clarifying important details, the background noise suppression system

100 could dynamically adjust noise reduction to prioritize clarity and minimize the risk of miscommunication.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A background noise suppression system, comprising an audio interface, memory having instructions stored thereon, and one or more processors coupled to the memory and the audio interface and configured to execute the instructions to:

project frames fragmented from input audio data into a higher dimension space than a lower dimension space of the input audio data;

apply an estimated speech mask to the frames, fragmented from the input audio data and projected into the higher dimension space, to separate speech components and noise components of the frames in the higher dimension space;

transform the speech components of the frames in the higher dimension space into a feature domain of the input audio data having the lower dimension space by performing a first inverse projection on the speech components to generate output audio data;

transform the noise components of the frames in the higher dimension space into the feature domain of the input audio data having the lower dimension space by performing a second inverse projection on the noise components to facilitate training a model to learn a difference between other speech and noise; and provide the output audio data via the audio interface, wherein the output audio data comprises a noise-suppressed version of the input audio data.

2. The background noise suppression system of claim 1, wherein the one or more processors are further configured to execute the instructions to post-process clean speech generated by performing the first inverse projection before providing the output audio data via the audio interface, wherein the output audio data comprises the post-processed clean speech and the post-processing comprises applying one or more of a frequency equalization technique or an automatic level control technique to the clean speech.

3. The background noise suppression system of claim 1, wherein the one or more processors are further configured to execute the instructions to reassemble the transformed speech components to generate a continuous audio stream of the output audio data.

4. The background noise suppression system of claim 1, wherein the one or more processors are further configured to execute the instructions to:

classify one or more portions of the input audio data as corresponding to a noise type based on one or more characteristics of the input audio data; and separate the one or more portions of the input audio data from the frames as part of the noise components.

5. The background noise suppression system of claim 1, wherein the input audio data is obtained via a microphone array and the one or more processors are further configured to execute the instructions to utilize one or more beamforming techniques to identify a direction of one or more portions of the input audio data, wherein the speech components and noise components of the frames are separated based in part on the direction.

6. The background noise suppression system of claim 1, wherein the one or more processors are further configured to execute the instructions to:

apply one or more speech emotion recognition algorithms to determine emotional content of a speech contained in the input audio data; and dynamically adjust a level of noise suppression applied to the input audio data based on the emotional content.

7. The background noise suppression system of claim 1, wherein the one or more processors are further configured to execute the instructions to apply an estimated noise mask to the frames to separate the speech components and the noise components of the frames, wherein the estimated speech mask facilitates identification of the speech components and the estimated noise mask facilitates identification of the noise components.

8. A method for background noise suppression, the method implemented by a background noise suppression system and comprising:

projecting frames fragmented from input audio data into a higher dimension space than a lower dimension space of the input audio data, wherein the input audio data comprises speech content;

applying a speech mask to the frames, fragmented from the input audio data and projected into the higher dimension space, to separate speech components and noise components of the frames, wherein the speech components are associated with the speech content; and transforming the speech components of the frames in the higher dimension space into a feature domain of the input audio data having the lower dimension space by performing a first inverse projection on the speech components to generate output audio data comprising a noise-suppressed version of the input audio data;

transforming the noise components of the frames in the higher dimension space into the feature domain of the input audio data having the lower dimension space by performing a second inverse projection on the noise components to generate noise; and training a model, using the generated noise, to distinguish between speech and other noise.

9. The method of claim 8, further comprising post-processing the output audio data, wherein the post-processing comprises applying one or more of a frequency equalization technique or an automatic level control technique.

10. The method of claim 8, further comprising reassembling the transformed speech components to generate a continuous audio stream of the output audio data.

11. The method of claim 8, further comprising:

classifying one or more portions of the input audio data as corresponding to a noise type based on one or more characteristics of the input audio data; and separating the one or more portions of the input audio data from the frames as part of the noise components.

12. The method of claim 8, wherein the input audio data is obtained via a microphone array and the method further comprises utilizing one or more beamforming techniques to identify a direction of one or more portions of the input audio data, wherein the speech components and noise components of the frames are separated based in part on the direction.

13. The method of claim 8, further comprising:

applying one or more speech emotion recognition algorithms to determine emotional content of a speech contained in the input audio data; and dynamically adjusting a level of noise suppression applied to the input audio data based on the emotional content.

14. The method of claim 8, further comprising applying an estimated noise mask to the frames to separate the speech components and the noise components of the frames, wherein the speech mask facilitates identification of the speech components and the noise mask facilitates identification of the noise components.

15. A non-transitory computer-readable medium comprising instructions for background noise suppression that, when executed by at least one processor, cause the at least one processor to:

project frames fragmented from input audio data obtained via an audio interface into a higher dimension space than a lower dimension space of the input audio data;

apply a speech mask to the frames, fragmented from the input audio data and projected into the higher dimension space, to separate speech components and noise components of the frames in the higher dimension space;

transform the speech components of the frames in the higher dimension space into a feature domain of the input audio data having the lower dimension space by performing a first inverse projection on the speech components to generate a noise-suppressed version of the input audio data; and transform the noise components of the frames in the higher dimension space into the feature domain of the input audio data having the lower dimension space by performing a second inverse projection on the noise components to facilitate training a model to learn a difference between other speech and noise.

16. The non-transitory computer-readable medium of claim 15, wherein the instructions, when executed by the at least one processor further cause the at least one processor to post-process the noise-suppressed version of the input audio data, wherein the post-processing comprises applying one or more of a frequency equalization technique or an automatic level control technique.

17. The non-transitory computer-readable medium of claim 15, wherein the instructions, when executed by the at least one processor further cause the at least one processor to:

classify one or more portions of the input audio data as corresponding to a noise type based on one or more characteristics of the input audio data; and separate the one or more portions of the input audio data from the frames as part of the noise components.

18. The non-transitory computer-readable medium of claim 15, wherein the input audio data is obtained via a microphone array coupled to the audio interface and the instructions, when executed by the at least one processor further cause the at least one processor to utilize one or more beamforming techniques to identify a direction of one or more portions of the input audio data, wherein the speech components and noise components of the frames are separated based in part on the direction.

19. The non-transitory computer-readable medium of claim 15, wherein the instructions, when executed by the at least one processor further cause the at least one processor to:

apply one or more speech emotion recognition algorithms to determine emotional content of a speech contained in the input audio data; and dynamically adjust a level of noise suppression applied to the input audio data based on the emotional content.

20. The non-transitory computer-readable medium of claim 15, wherein the instructions, when executed by the at least one processor further cause the at least one processor to apply an estimated noise mask to the frames to separate the speech components and the noise components of the frames, wherein the speech mask facilitates identification of the speech components and the noise mask facilitates identification of the noise components.

\* \* \* \* \*